Figure 1:
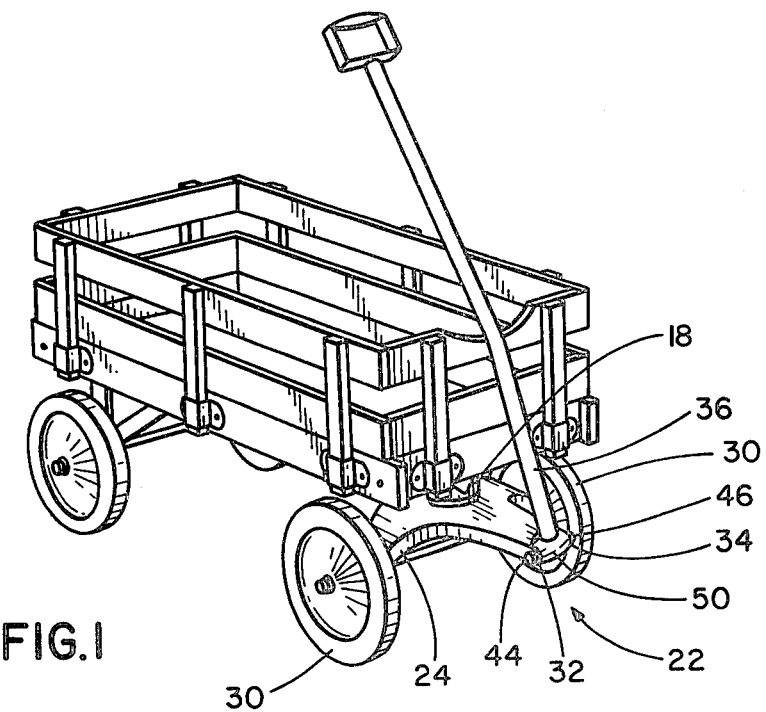

United States Patent [19]

Tonelli et al.

[11] 4,222,582
[45] Sep. 16, 1980

[54] COASTER WAGON WITH SAFETY CAP

[75] Inventors: Roger Tonelli, Elmwood Park; Fredrick Michelau, Des Plaines, both of Ill.

[73] Assignee: Radio Steel & Mfg. Co., Chicago, Ill.

[21] Appl. No.: 943,210

[22] Filed: Sep. 18, 1978

[51] Int. Cl.² ............................................. B62B 9/20
[52] U.S. Cl. ............................................ 280/87.02 R
[58] Field of Search ................. 280/87.01, 87.02 R

[56] References Cited
U.S. PATENT DOCUMENTS

| 2,008,951 | 7/1935 | Fowler | 280/87.01 |
| 2,418,971 | 4/1947 | Duffy | 280/87.01 |
| 2,481,114 | 9/1949 | Hayhurst | 280/87.01 |
| 2,913,250 | 11/1959 | Feuer | 280/87.01 |

Primary Examiner—John J. Love
Assistant Examiner—Randall A. Schrecengost

[57] ABSTRACT

A coaster wagon having a safety cap from which the handle extends in the portion connected to the steering mechanism in which the safety cap is in the form of a tubular member mounted for rotational movement about a horizontal axis on the steering mechanism with portions extending forwardly beyond the steering mechanism as a protective member.

4 Claims, 2 Drawing Figures

COASTER WAGON WITH SAFETY CAP

This invention relates to coaster wagons and to an element employed therein.

To the present, coaster wagons have been constructed with a handle pivotally connected to a portion of the steering assembly which extends forwardly of the wagon body and which in turn is mounted for rotational movement on a turntable fixed to the bottom side of the body portion of the wagon. The pivotal connection between the rearward end of the handle and the forwardly projecting end portion of the steering assembly has been by way of positioning the end of the handle between spaced tabs, with the openings in the tabs crosswise aligned with an opening through the end portion of the handle through which a bolt can be inserted pivotally to secure the handle between the tabs for rotational movement about the horizontal axis of the connecting bolt.

This assembly permits use of the handle to pull the wagon and steer the wagon via the front wheels which are mounted for free rotational movement on the ends of an axle which extends crosswise from the steering assembly.

The projecting end portion of the steering assembly has been the source of considerable danger as when the tab and end portion is allowed to come into engagement with the Achilles tendon of one pulling the wagon. This has been the source of much pain and considerable thought has been given to redesign of the coaster wagon with a view towards eliminating this problem.

It is an object of this invention to provide a simple and effective solution to the problem raised by coaster wagons of previous design while at the same time improving the appearance of the coaster wagon as well as its handling characteristics.

Figure 2:
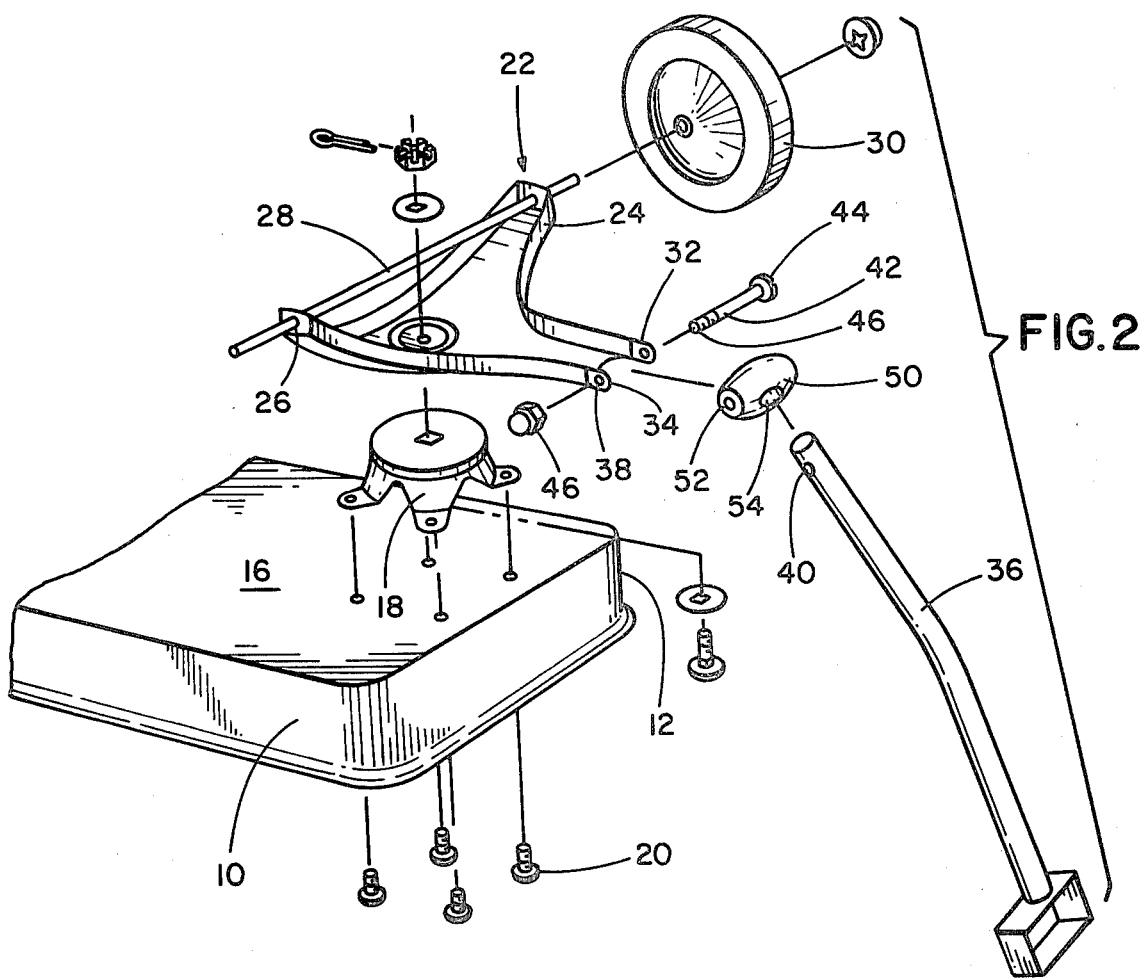

These and other objects and advantages of this invention will hereinafter appear and for purposes of illustration, but not of limitation, an embodiment of the invention is shown in the accompanying drawing in which:

FIG. 1 is a schematic view, in perspective, of a coaster wagon embodying the features of this invention, and FIG. 2 is a diagrammatic view showing the relationship of parts for assembly of that portion of the coaster wagon embodying the features illustrated in FIG. 1.

Referring to FIG. 2 of the drawing, illustration is made, bottom side up, of the front end portions of a coaster wagon having side walls 10 and 12, front end wall 14 and bottom wall 16. A turntable 18 is secured as by screws 20 to the underside of the bottom wall 16 for mounting a steering assembly 22 for rotational movement about a vertical axis relative thereto.

The steering assembly 22 is provided with laterally spaced apart depending flanged portions 24 having crosswise aligned openings 26 through which a front axle 28 extends for mounting wheels 30 for free rotational movement on the through extending end portions.

The steering assembly is formed with a forward end portion that extends beyond the front end wall 14 of the wagon and below the bottom wall 16, with a pair of laterally spaced apart tabs 32 and 34 projecting forwardly as a yoke between which the handle 36 is mounted. For this purpose, the tabs are provided with crosswise aligned openings 38 and the end portion of the handle adapted to be secured between the tabs is provided with crosswise extending opening 40 for crosswise alignment with the tab openings 38 to enable a fastening bolt 42 to extend through the crosswise aligned openings pivotally to secure the end of the handle 36 between the tabs 32-34 of the steering assembly 22. The fastening bolt 42 is formed with a head 44 at one end dimensioned to be larger than the openings 38 and a threaded portion 46 on the through extending portion for threaded engagement by a fastening nut 46.

In accordance with the practice of this invention, there is provided a tubular member 50, preferably of elliptical shape, having a passage 52 extending axially therethrough dimensioned to enable transmission of the fastening bolt 44 and another passage 54 midway between the ends of the tubular member extending radially into the tubular member for a distance to extend beyond the axis by an amount at least as great as the distance between the end of the handle 36 and the passage 40 extending therethrough. Thus the end portion of the handle can be inserted into the passage 54 by an amount to align the crosswise extending bore 54 with the passage 40 through the handle and the passages 32-38 of the steering mechanism. When aligned, the fastening rod or bolt 42 can be passed through the tabs and through the aligned passages of the handle and tubular member to secure the handle to the tubular member and to secure the tubular member and handle between the yoke for pivotal connection to the steering mechanism. It will be obvious that the radial passage into the tubular member may extend entirely radially through the tubular member and that it may be formed of a cross section corresponding to the telescoped portion of the handle but of slightly greater dimension to enable the end portion of the handle to be easily inserted or telescoped therein.

The tubular member, which more or less functions as a bumper, can be made of wood, plastics, or elastomeric material having a width in the axial direction which is less than the distance between the tabs 32-34 and a cross section perpendicular to the axis which, at the ends is as great or preferably greater than the tab portion between which the tubular member is engaged, and with a central portion of still greater dimension and preferably sloped to provide the desired elliptical shape.

With the improvement in the assembly of coaster wagons, the danger of injury to the Achilles heel or other pain resulting from impact with the steering portion of the wagon is substantially obviated while obtaining the additional benefit of improved appearance and operation in utilization of the coaster wagon.

It will be understood that changes may be made in the details of construction, arrangement and operation without departing from the spirit of the invention, especially as defined in the following claims.

We claim:

1. In a coaster wagon having a handle adapted to be secured at one end portion between spaced tabs on a portion which extends forwardly from a steering mechanism, in which the tabs are formed with crosswise aligned openings for crosswise alignment with an opening through the end portion of the handle for passage of a connecting rod therethrough pivotally to secure the handle to the steering mechanism for rocking movement about a horizontal axle relative thereto, the improvement which comprises a tubular member dimensioned to be received between the tabs, said tubular member having an axial passage extending crosswise therethrough for alignment with the openings in the tabs and a radial opening extending from the surface of the tubular member perpendicular to the axial passage for a distance into the tubular member to extend beyond the passage but less than the diameter of the tubular member to receive the end portion of the handle in telescoping relation and a depth to extend beyond the axial passage to enable insertion of the handle end portion into the opening to align the crosswise extending opening with the axial passage of the tubular member and tabs, the securing rod extending through the aligned openings of the tabs, the tubular member and handle portion to secure the handle and tubular member to the steering mechanism, the tubular member being dimensioned to have a length corresponding to the spaced relation between the tabs to be received in fitting relation therebetween and a radius in the end portions adjacent the tabs which is greater than the distance between the opening through the tabs and the end portions of the tabs so that the tubular member extends radially beyond the tabs whereby the tubular member functions as a curvilinear bump at the point of interconnection between the handle and the steering mechanism.

2. A coaster wagon as claimed in claim 1 in which the opening extending radially into the tubular member is dimensioned to have a length at least as great as the radius of the tubular member at the opening plus the distance between the end of the handle portion and the passage extending therethrough.

3. A coaster wagon as claimed in claim 1 in which the tubular member is of elliptical shape with the portion of greater diameter at the center.

4. A coaster wagon as claimed in claim 1 in which the means for attachment comprises a bolt extending through the aligned openings and means for securing the bolt in position of use.

* * * * *